No. 892,384. PATENTED JUNE 30, 1908.
C. A. SMITH.
VEHICLE.
APPLICATION FILED APR. 23, 1907.
2 SHEETS—SHEET 2.
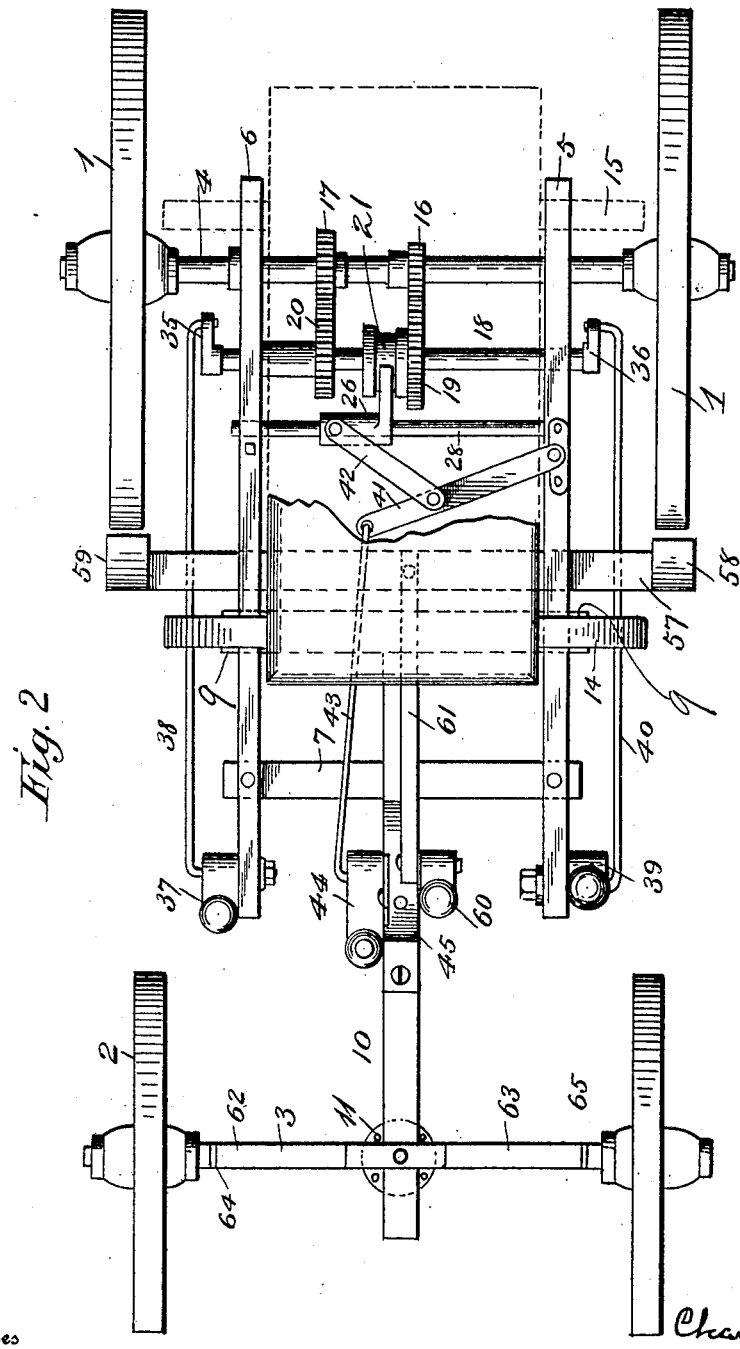

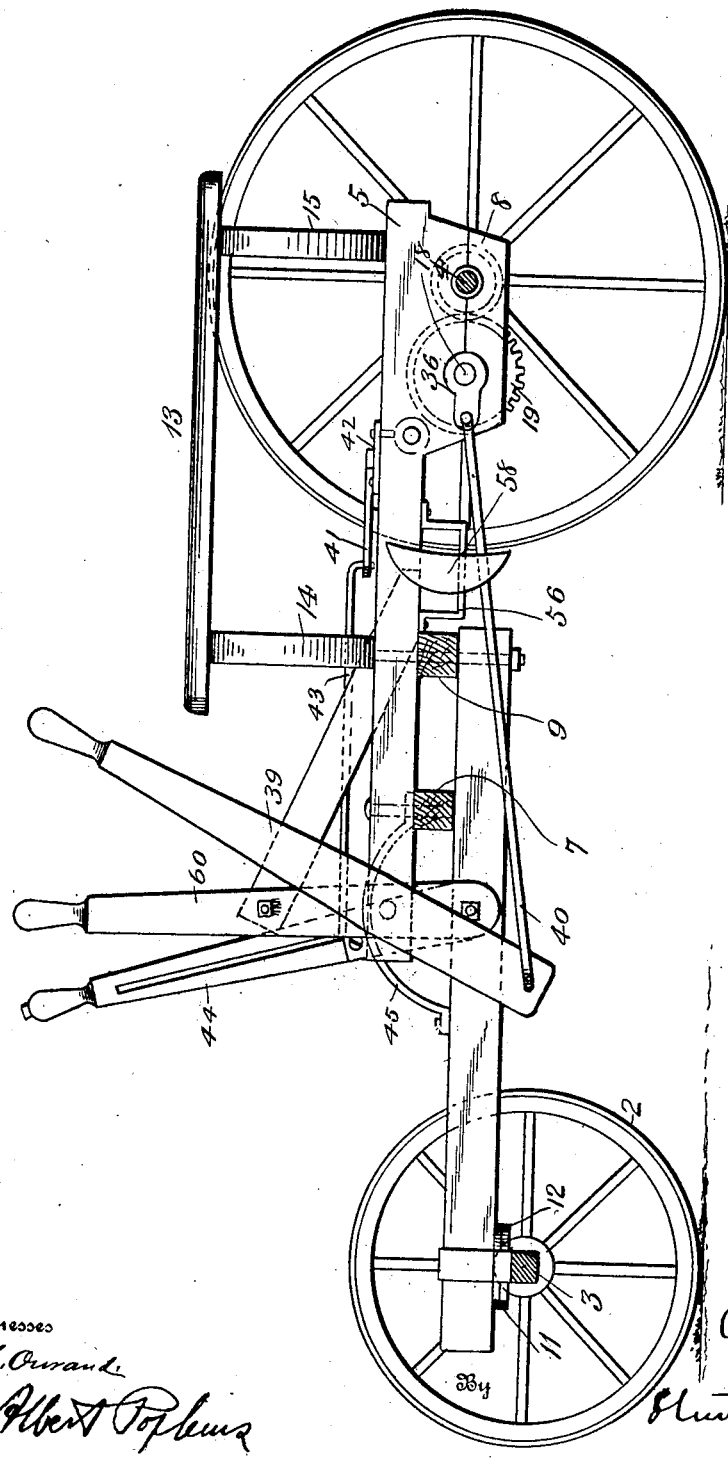

UNITED STATES PATENT OFFICE.

CHARLES A. SMITH, OF BRATTLEBORO, VERMONT, ASSIGNOR TO NATIONAL NOVELTY CORPORATION, OF NEW YORK, N. Y., A CORPORATION OF NEW JERSEY.

VEHICLE.

No. 892,384.      Specification of Letters Patent.      Patented June 30, 1908.

Original application filed February 2, 1907, Serial No. 355,402. Divided and this application filed April 23, 1907.
Serial No. 369,804.

*To all whom it may concern:*

Be it known that I, CHARLES A. SMITH, a citizen of the United States, residing at Brattleboro, in the county of Windham, State of Vermont, have invented certain new and useful Improvements in Vehicles, of which the following is a description, reference being had to the accompanying drawing and to the letters and figures of reference marked thereon.

My invention relates to new and useful improvements in vehicles and has for its object to simplify the construction of the framework and to so locate the operating levers for said vehicle that the same may be easily accessible to the rider.

This application is a division of my application Serial No. 355,402, filed February 2, 1907.

In the accompanying drawings which show one embodiment of my invention: Figure 1 is a side elevation of a vehicle having my improvements applied thereto, the rear wheels being removed and the axles shown in section. Fig. 2 is a top plan view of a vehicle embodying my invention with the seat being broken away to expose the driving mechanism.

The vehicle is provided with the usual running wheels 1, 1, and 2, 2. The forward wheels 2, 2 are mounted on an axle 3 and the rear wheels 1, 1 are mounted on an axle 4. The framework which connects the front and rear axles and supports the driving mechanism and seat of my improved vehicle comprises side members 5 and 6 which are connected at their forward end by a cross brace 7. The side pieces 5 and 6 have bolted thereto at the under side and at their rear end box carrying members 8, 8. These members 8, 8 are made in two parts and the bearings for the rear axle are clamped between said members. At a short distance forward of the center of the side members 5 and 6 is a second cross brace 9. The frame is connected to the forward axle by a centrally located reach 10. Said reach is bolted or otherwise suitably secured to the cross braces 7 and 9. At the forward end the said reach is pivoted to the central portion of the forward axle. In order to form a durable pivotal support, I have provided the lower side of said reach with a circular plate 11, which is rigidly secured thereto and a similar plate 12 is carried by the axle. Said two plates have their faces in contact and serve to form a durable pivotal support, in the nature of a fifth wheel.

The seat 13 for the rider is carried by bowed steel springs 14 and 15. The spring 14 has its free ends secured to the side pieces 5 and 6 and extends outwardly and upwardly and entirely across underneath the seat. The spring 15 is of similar construction and is secured to the members 5 and 6 near their rear ends.

The running wheels 1, 1 are rigidly secured to the axle or supporting shaft 4. Said shaft 4 is provided intermediate its ends with gear wheels 16 and 17 rigidly secured to said axle. Said gear wheel 16 is of less diameter than the gear wheel 17. An intermediate driving shaft 18 is located slightly in front of the axis or shaft 4 and is carried by suitable bearings supported by the members 8, 8. Said shaft is provided with gears 19 and 20 which are suitably proportioned and spaced so as to engage the gears 16 and 17 respectively. Said gears 19 and 20 are mounted so as to normally run free upon the shaft 18, but are secured from lateral movement thereon. Intermediate the gears 19 and 20, is a clutch member 21 feathered on shaft 18. Said clutch member 21 is provided with suitable devices whereby it may be engaged with either the gear 20 or 19, or so set between said gears as to be free from both of said gears. The rod 28 slidingly supported in the side members 5 and 6 carries a forked member 26 for shifting said clutch.

The shaft 18 at its outer ends is provided with suitable cranks 35 and 36 which are angularly spaced upon said shaft. At the forward end of the side piece 6 is pivoted a hand lever 37. Said lever 37 projects downward below its pivotal connection and has its lower end connected to a link 38. The opposite end of said link 38 is connected to the crank 35. Pivotally secured to the side piece 5 is a similar hand lever 39 which is connected by means of a link 40 to the crank 36.

The rod 28 which shifts the clutch member 21 is moved longitudinally in its bearings by means of a lever 41. Said lever 41 intermediate its ends is connected by a link 42 to the member 26. Said lever 41 at its outer end is connected by a link 43 to a hand lever 44. Said lever 44 is pivoted at its lower end to the center reach 10, while the link 43 is connected to said lever at a short distance above said pivotal connection. Connected to said reach at one end and to the cross brace 7 at the other end, is a locking segment 45 for holding the lever 44 in predetermined positions. Said locking segment 45 is bent in the arc of a circle the center of which co-incides with the pivotal support for the lever 44. This locking segment 45 is provided with three openings. The lever 44 carries a locking bolt coöperating with the openings in the locking segment 45.

The side members 5 and 6 are each provided with a U shaped bracket 56 which is secured to the under side of said pieces. Within said brackets is mounted a brake beam 57, which carries on its outer ends brake shoes 58 and 59. Said brake beam is operated by a lever 60 which is mounted on the same pivotal support as the lever 44. Said lever 60 is connected to the brake beam by means of a link 61 which is pivoted to said lever 60 intermediate its ends. The operation of my brake mechanism will be obvious.

When it is desired to operate the brake, the rider pulls upon the lever 60 which through the link 61 slides the brake beam within the brackets 56 and brings the brake shoes 58 and 59 into contact with the rear running wheels.

The operation of my device is thought to be obvious from the above description. The rider sits upon the seat 13 and places his feet upon the foot rests 62 and 63, carried by the front axle. Said foot rests are formed by a metal strip having up-turned ends 64 and 65 and at its central portion said strip extends up over the reach 10 and serves to strengthen and support the pivotal connection of the reach 10 with the forward axle. The vehicle is guided by means of the feet resting upon the front axle. It will be obvious however, that in certain aspects of my invention any other means may be provided for guiding the vehicle. When it is desired to operate the vehicle at low speed the clutch lever 44 is thrown rearward. In this position the clutch member 21 is brought into engagement with the gear 20. The rider then operates the levers 37 and 39 which in turn rotate the shaft 18 and through the shaft 18 the gear 16 turn the running wheels. When it is desired to operate the vehicle at high speed, the lever 44 is moved to its extreme forward position. When in this position the clutch member 21 is brought into engagement with the gear 19.

When it is desired to coast or to allow the vehicle to run free of all driving connection, the lever 44 is brought into intermediate position. In this position of the lever 44, the clutch member 21 is held centrally positioned between the gears 19 and 20 and entirely out of engagement therewith. The gears 19 and 20 will then run free upon the driving shaft.

Having thus particularly described my invention, what I claim as new and desire to secure by Letters Patent, is:

In a child's cart, front and rear axles, supporting wheels thereon, a pair of widely spaced side bars, bearing blocks disposed at the rear ends thereof and carrying the rear axle, bowed springs connecting the side bars, a seat mounted on the springs, a pair of cross braces secured to the undersides of the bars to the rear of the forward ends thereof, propelling levers pivoted to the forward portions of said bars, a centrally disposed reach extending from the cross braces to the front axle, a pivot pin connecting the reach and front axle, a foot rest strip secured to the top of the front axle and passing over the reach, said strip having an opening for the passage of the pin, and a pair of controlling levers pivoted to the reach at a point in advance of the seat.

In testimony whereof I affix my signature, in presence of two witnesses.

CHAS. A. SMITH.

Witnesses:
L. G. TASKER,
C. L. STICKNEY.